US006367318B1

(12) United States Patent
Boyer et al.

(10) Patent No.: US 6,367,318 B1
(45) Date of Patent: Apr. 9, 2002

(54) MULTICHARGE IGNITION SYSTEM HAVING COMBUSTION FEEDBACK FOR TERMINATION

(75) Inventors: John W. Boyer, Westfield; Raymond O. Butler, Jr., Anderson; Scott Birk Kesler, Kokomo; Daniel J. O'Connor, Westfield, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/527,889

(22) Filed: Mar. 20, 2000

(51) Int. Cl.[7] .............................. G01L 3/26; G01L 5/13

(52) U.S. Cl. ........................................................ 73/116

(58) Field of Search ................................ 73/116, 35.08; 324/380, 382, 393, 399, 402; 123/609, 637

(56) References Cited

U.S. PATENT DOCUMENTS

| | | | |
|---|---|---|---|
| 5,014,676 A | 5/1991 | Boyer ........................ | 123/637 |
| 5,462,036 A | 10/1995 | Kugler et al. ............... | 123/609 |
| 5,866,808 A | 2/1999 | Ooyabu et al. ............... | 73/116 |

*Primary Examiner*—William Oen
(74) *Attorney, Agent, or Firm*—Margaret A. Dobrowitsky

(57) ABSTRACT

An ignition system for an internal combustion engine includes an ignition coil coupled to a spark plug in a combustion chamber of the engine, and a switch responsive to an ignition control signal for causing a primary current to flow through a primary winding of the ignition coil. A control circuit is configured to generate the ignition control signal so as to produce a plurality of sparks at the spark plug during a combustion event in the cylinder. A combustion detection circuit in sensing relation with the combustion cylinder is configured to generate a combustion detect signal when combustion occurs. The control circuit is further configured to terminate the generation of the ignition control signal during the combustion event in response to the combustion detect signal, thereby terminating multicharge operation when the need for further sparks is no longer present. Unnecessary spark plug wear is avoided.

20 Claims, 3 Drawing Sheets

MULTICHARGE IGNITION SYSTEM HAVING COMBUSTION FEEDBACK FOR TERMINATION

RELATED APPLICATIONS

This application claims the benefit of copending U.S. application Ser. No. 09/328,747, filed Jun. 9, 1999, which is incorporated herein by reference in its entirety.

BACKGROUND OF THE INVENTION

1. Field of the Invention

The present invention relates generally to a system for controlling ignition in an internal combustion engine, and more particularly, to a system configured to produce repetitive spark for ignition having termination based on the feedback information concerning the state of combustion.

2. Description of the Related Art

There has been much investigation in the ignition art directed to systems for generating multiple spark events during combustion. Such systems are sometimes referred to as “multicharge” systems. Such ignition systems provide a succession of spark breakdowns to ensure ignition of a combustible air/fuel mixture introduced into a cylinder of an internal combustion engine, as seen by reference to U.S. Pat. No. 5,014,676 issued to Boyer. Boyer discloses a system configured to provide a series of sparks to increase the number of ignition events and hence the probability of combustion of the air/fuel mixture by extending the time and total energy available for combustion. Boyer discloses an ignition coil that undergoes an initial charge (i.e., initial dwell) wherein a primary current is established in a primary winding of the ignition coil. The initial dwell is immediately followed by an initial discharge of the ignition coil wherein a secondary current in a secondary winding thereof discharges through a spark plug to generate a first spark. Subsequent recharge intervals (i.e., subsequent dwell periods) follow, accompanied by respective discharge intervals (i.e., spark events). The number of sparks produced is generally determined by a predetermined operating strategy (e.g., a fixed number of sparks, or, the greatest number of sparks that can be initiated before the end of a predetermined angle of engine rotation). However, prior approaches such as the system disclosed in Boyer have shortcomings.

One shortcoming involves unnecessary spark plug wear due to added spark events after combustion has already commenced. Another shortcoming involves the unnecessary delivery of energy to the combustion chamber at certain operating conditions (e.g., via additional sparks when combustion has already commenced via earlier sparks). Reservations arising from these shortcomings have, to some extent, impeded acceptance of multicharge ignition systems, which have many advantages, such as enhanced initiation of combustion, especially under less than ideal combustion conditions.

It is also known to provide a system for determining a combustion condition in an internal combustion engine, as seen by reference to U.S. Pat. No. 5,866,808 to Ooyabu et al. Ooyabu et al. disclose an apparatus for detecting a level of combustion by sensing an ion current level.

There is therefore a need to provide an ignition control system for producing repetitive spark in a combustion chamber of an internal combustion engine that minimizes or eliminates one or more of the shortcomings as set forth above.

SUMMARY OF THE INVENTION

An ignition system in accordance with the present invention is characterized by the features specified in claim 1.

One object of the present invention is to provide an ignition system suitable for use in generating repetitive spark that minimizes or eliminates the number of unnecessary spark events to reduce spark plug wear.

It is another object of the present invention to deliver only the amount of energy necessary to start combustion.

These and other objects, advantages, and features of the present invention are realized by an ignition system in accordance with the present invention. One advantage of the present invention is that multicharge operation (i.e., repetitive spark during the firing of one cylinder) is terminated when combustion has commenced and has proceeded to a predefined level, as determined by a combustion detection circuit. This termination feature eliminates unnecessary spark events, thereby reducing spark plug wear. In addition, since multicharge operation is terminated when combustion is detected, there is no unnecessary delivery of energy to the combustion chamber beyond that required for initiating combustion of an air/fuel mixture introduced into the chamber.

An ignition system in accordance with the present invention is configured for use with an internal combustion engine. The ignition system includes an ignition coil having a primary winding and a secondary winding that is coupled to a spark plug in a combustion chamber of the engine. The system further includes a switch responsive to an ignition control signal for causing a primary current to flow through the primary winding circuit. The system also includes a control circuit, which is configured to generate the ignition control signal so as to produce a plurality of sparks at the spark plug during a combustion event in the cylinder. The ignition system further includes a combustion detection circuit that is disposed in sensing relation with the combustion cylinder. The combustion detection circuit is configured to generate a combustion detect signal when combustion has begun and has proceeded to a preselected level. Advantageously, the control circuit is further configured to terminate the ignition control signal to avoid further spark events in response to the combustion detect signal.

Other objects, features, and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
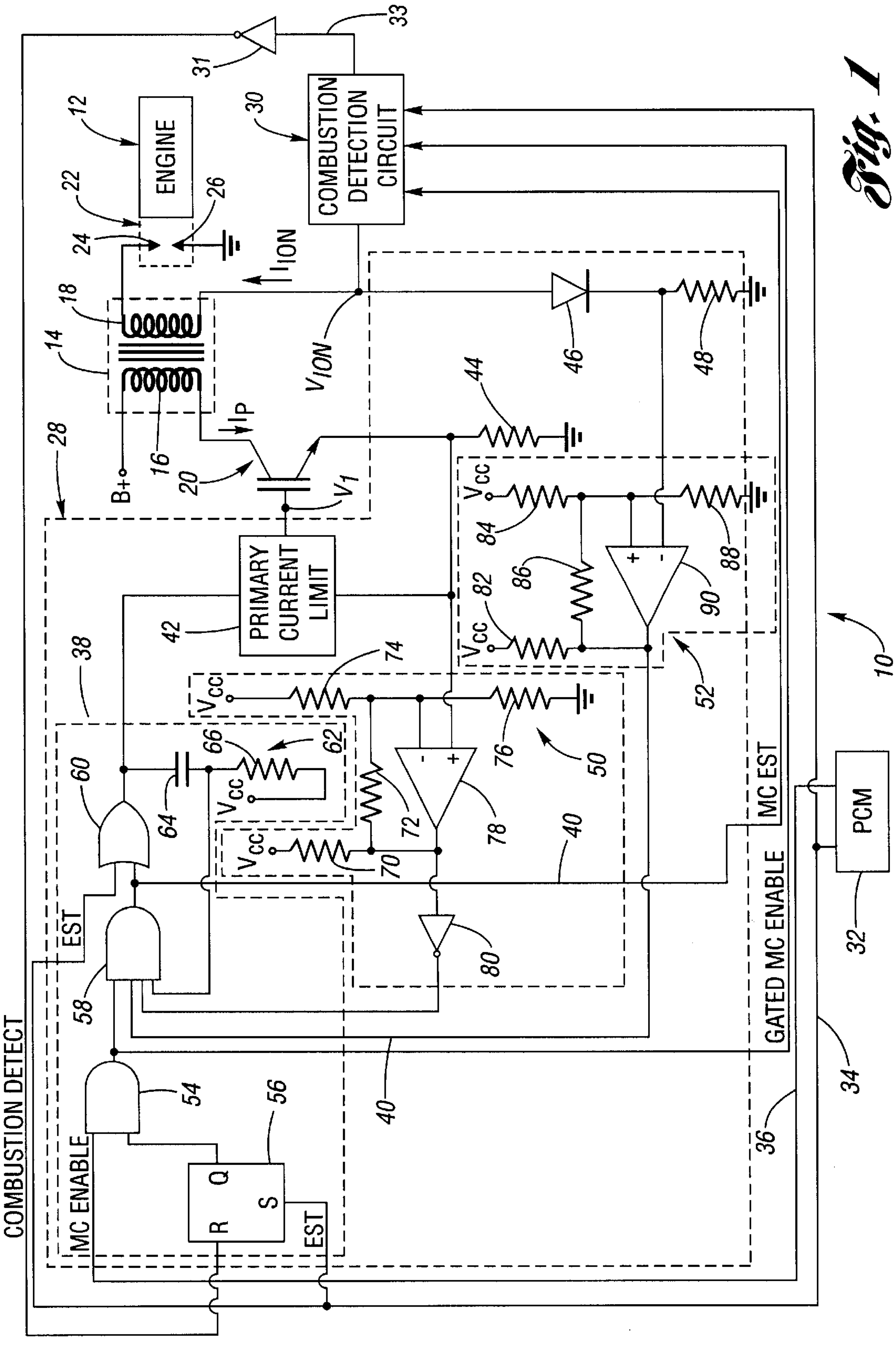
FIG. 1 is a simplified schematic and block diagram view of an ignition system in accordance with the present invention.

Referring now to the drawings wherein like reference numerals are used to identify identical components in the various views, FIG. 1 illustrates an ignition system 10 for controlling repetitive spark in an internal combustion engine 12. System 10 includes an ignition coil 14 comprising primary winding 16 and secondary winding 18, a switch 20, a spark plug 22 comprising a first electrode 24 and a second electrode 26, a first control circuit 28, and a combustion detection circuit 30. FIG. 1 further illustrates a second control circuit, such as a powertrain control module (PCM) 32.

Before proceeding to a detailed description of system 10 keyed to the drawings, a general overview of the control established by the present invention will be set forth. A key disadvantage of conventional multicharge systems involves generating sparks after combustion has been initiated and is proceeding along, which results in unnecessary spark plug wear. The present invention implements a multicharge ignition system having feedback from a combustion/misfire detection system as to the state of combustion. This combustion condition information, when interpreted as constituting satisfactory combustion, is used to terminate multicharge operation (i.e., discontinue generation of sparks during the firing of a single cylinder). This action is done on the basis that additional energy that would otherwise be contributed by further sparking is not required in the combustion cylinder.

With continued reference to FIG. 1, engine 12 may be of the type having a direct ignition system for initiating combustion. In the illustrated embodiment, one ignition coil is provided per plug 22.

Ignition coil 14 is configured to function as a selectively controllable step-up transformer. One end, such as the high side end, of primary winding 16 is connected to a supply voltage provided by a power supply, such as a vehicle battery (not shown), hereinafter designated "B+" in the drawings. Supply voltage B+ may nominally be approximately 12 volts. A second end of primary winding 16 opposite the high side end is connected to switch 20. A first end of secondary winding 18, namely the high side end, is coupled to spark plug 22. A second end of secondary winding 18 opposite the high side end, namely the low side end, is connected to a ground node through circuitry to be described in further detail hereinafter. Primary winding 16 and secondary winding 18 are matched in a predetermined manner known in the art.

Switch 20 is provided to selectively connect primary winding 16 to ground, in accordance with an ignition control signal, designated $V_1$, generated by first control circuit 28. Such connection via closure of switch 20, as is known generally in the art, will cause a primary current $I_p$ to flow through primary winding 16. Of course, when the ignition control signal $V_1$ is discontinued (deasserted), switch 20 is opened and the primary current $I_p$ is interrupted, thereby producing a spark across the spark plug gap. Switch 20 is illustrated in FIG. 1 as an insulated gate bipolar transistor (IGBT); however, it should be understood that such illustration is exemplary only and not limiting in nature. Switch 20 may comprise alternative conventional components known to those of ordinary skill in the art.

Coil 14 and switch 20 together define the means for selectively storing energy, preferably in a predetermined amount, and thereafter transferring the stored energy to spark plug 22.

Spark plug 22 is disposed in engine 12 proximate a cylinder thereof, and is configured to produce a spark across a gap defined by spaced electrodes 24, 26. The spark event, as is generally understood by those of ordinary skill in the art, is provided to ignite an air and fuel mixture introduced into the cylinder. During the spark event, a spark current flows across plug electrodes 24, 26. In addition, spark plug 22 is configured so that when biased by the "make" voltage of the coil 14, an ion current, designated $I_{ION}$ in FIG. 1, is conducted across electrodes 24, 26. The "make" voltage is a positive voltage that is generated across the spark plug gap during charging of ignition coil 14. The magnitude of the ion current is indicative of a combustion condition, such as combustion, and/or misfire. The greater the ion current (i.e., due to more ionized molecules present in the cylinder arising from combustion), the more complete the combustion.

Control circuit 28 is configured to generate the ignition control signal $V_1$ to open and close switch 20 for alternately causing primary current $I_p$ to flow through primary winding 16, and to interrupt the primary current $I_p$ to produce a spark. Control circuit 28 also implements a multicharge ignition control strategy, controlling the generation of the ignition control signal $V_1$ so as to repetitively interrupt the primary current during a single combustion event, thereby producing a plurality of sparks at spark plug 22 in the cylinder of engine 12. Control circuit 28 is further configured to discontinue (i.e., deassert) the ignition control signal when a combustion detect signal is generated. This is operative to terminate multicharge operation of system 10 for the firing of that particular cylinder. Accordingly, unnecessary sparks are not generated.

Control circuit 28 achieves these and other functions in response to a combustion detect signal 33 provided from combustion detection circuit 30, which is inverted by gate 31. Additional input signals to control circuit 28 include a first electronic spark timing (EST) signal 34 and a multicharge enable (MC ENABLE) signal 36, both from PCM 32. PCM 32 is configured to generate the EST signal 34 and the MC ENABLE signal 36 according to a predetermined operating strategy, based on a plurality of engine operating parameter inputs, known to those of ordinary skill in the art. For example, in the illustrated embodiment, PCM 32 determines the initial charging time (e.g., duration of the EST signal), and the relative timing (e.g., relative to cylinder top dead center) of when the initial spark is to occur. In addition, PCM 32 also determines the nominal duration of multicharge operation (e.g., duration of the MC ENABLE signal), which may be selected to end based on a predetermined angular position of the piston relative to top dead center. PCM 32 may also determine when to enable multicharge at all.

In the illustrated embodiment, control circuit 28 includes a circuit 38 for generating a second EST signal (a multicharge EST signal—MC EST) 40, a primary current limiting circuit 42, a primary current sense element 44, a diode 46, a secondary current sense element 48, a primary current trip circuit 50 and a secondary current trip circuit 52.

Circuit 38 provides the means for outputting the ignition control signal by combining the EST signal 34 and the MC EST signal 40 in timed relation to each other during the multicharge interval. The multicharge interval corresponds to the duration of the MC ENABLE signal 36. Circuit 38, in an illustrated embodiment, may include a two-input logical AND gate 54, an RS-type flip flop 56, a four-input logical AND gate 58, a two-input logical OR gate 60 and a minimum "OFF" time circuit 62 comprising a capacitor 64, and a resistor 66.

With continued reference to FIG. 1, AND gate 54, and flip flop 56 comprise the front-end logic of circuit 38, which has a number of modes of operation. A first mode exists when the MC ENABLE signal is low. The MC ENABLE signal 36 is an active high signal, and is asserted when the EST signal 34 is deasserted. In a preferred embodiment, the MC ENABLE stays low during the initial charging of coil 14 (i.e., when EST goes high). This causes AND gate 54 to output a logic low, which in turn causes AND gate 58 to also output a logic low. Therefore, the output of OR gate 60 depends solely on the EST signal 34 when MC ENABLE is low. During the active-high assertion of the EST signal 34, flip flop 56 is "SET", inasmuch as the EST signal 34 is applied to an S-input of flip flop 56. Accordingly, an output of flip flop 56 will be placed into and remain in a logic high state. The inverted combustion detect signal, $\overline{\text{COMBUSTION DETECT}}$, is initially a logic low, and will go high only when combustion occurs to a predefined level. Accordingly, since the $\overline{\text{COMBUSTION DETECT}}$ signal is applied to the R-input ("RESET") of flip flop 56, the logic high output based on the EST signal 34 is unaffected.

The front-end logic of AND gate 54 and flip flop 56 also has a second mode of operation that exists when MC ENABLE is high. For example, during the initial phases of multicharge operation, the EST signal goes low and the MC ENABLE signal goes high. When this occurs, both inputs to AND gate 54 are in a logic high state. The output of AND gate 54 therefore is also a logic high, which is provided as an input to AND gate 58. Since the EST signal is low when MC ENABLE goes high, the output of OR gate 60 now depends on the output of AND gate 58, which in-turn depend on its inputs.

The AND gate 58 receives four input signals. The first input signal is from the output of AND gate 54 and is referred to as a GATED MC ENABLE signal. The GATED MC ENABLE signal will go low when either of the following two conditions occur: (i) combustion is detected, or (ii) the multicharge interval ends. In either case, the logic low GATED MC ENABLE is operative to terminate multicharge operation. The second and third input signals to AND gate 58 are from the primary current trip circuit 50 and secondary current trip circuit 52, respectively. These input signals control the recharge and discharge (spark) interval durations during multicharge operation. The fourth input signal to AND gate 58 is a feedback signal used to define a minimum "OFF" time of the switch 20 during multicharge operation. How each of the four inputs is generated will be described below in detail. Based on the four inputs, the AND gate 58 generates the MC EST signal 40. The two-input OR gate 60 receives the EST signal 34, and the MC EST signal 40. The output of OR gate 60 is provided to control switch 20, by way of a primary current limit circuit 42.

A description of how each of the four inputs to AND gate 58 are generated will now be set forth, in-turn. As to the above-mentioned first input, as described above, initially after MC ENABLE goes high, the output of AND gate 54 also goes high. When the combustion detect signal 33 is generated, the $\overline{\text{COMBUSTION DETECT}}$ signal is applied to the "RESET" input of flip flop 56, and the output thereof transitions to a logic low state. This causes AND gate 54 to output a logic low, which is passed to AND gate 58.

The above-described second input to AND gate 58 is generated by circuit 50. Primary current trip circuit 50 is used during multicharge operation to determine the duration that coil 14 is charged (or "recharged"). Circuit 50 may include resistors 70, 72, 74, 76, a comparator 78 and an inverter 80. Circuit 50 is configured generally to output a logic high signal at the output of inverter gate 80 while the level of the primary winding current $I_p$ is less than a predetermined reference level. However, when the level of primary current, as indicated by the voltage across resistor 44, exceeds a predetermined level (e.g., 10 amps), then the output of comparator 78 changes (at least momentarily), thereby changing the output of inverter gate 80 from a logic high to a logic low. This high-to-low change in state has the effect of disabling or discontinuing the MC EST signal 40. It should be appreciated by those of ordinary skill in the art that the network of resistors 70, 72, 74 and 76 establishes the reference voltage that is applied to the inverting input of comparator 78, and against which the voltage across resistor 44 is compared. Resistor 72 also provides the required feedback from output to input of comparator 78. Elements 70–80 may comprise conventional components known to those of ordinary skill in the art.

The above-described third input to AND gate 58 is produced by circuit 52 in cooperation with a secondary current sense arrangement. The secondary current sense arrangement includes a diode 46 and sense element 48. Diode 46 is configured to direct a secondary current (i.e., spark current) that flows through spark plug 22 and secondary winding 18 through a path to ground. Diode 46 prevents current from flowing from ground through sense element 48 when a make voltage bias is applied to spark plug 22 as a result of closing switch 20. This insures that ion current $I_{ION}$ is sourced only from combustion detection circuit 30. This insures accurate measurement of the $I_{ION}$ current. The voltage developed across sense resistor 48 is proportional to the level of secondary winding current. This voltage is provided to secondary current trip circuit 52.

Secondary current trip circuit 52 is used during multicharge operation to determine the duration that coil 14 discharges. Circuit 52 may include resistors 82, 84, 86, 88 and a comparator 90. Circuit 52 is configured to output a logic low signal at the output of comparator 90 so long as the level of the secondary current exceeds a predetermined threshold level. When the secondary current through secondary winding 18, as indicated by the voltage across resistor 48, decays to the predetermined threshold, then the output of comparator 90 changes state from a logic low to a logic high, which is provided to AND gate 58. The low-to-high change of state has the effect of enabling the MC EST signal 40 for further multicharge operation. Thus, when there is no secondary current (i.e., no spark current), circuit 52 outputs a logic high as well. Resistors 82, 84, 86, and 88 are configured to both establish a reference voltage that is applied to the non-inverting input of comparator 90, as well as provide the necessary feedback for the configuration illustrated in FIG. 1. Elements 82–90 may comprise conventional components known to those of ordinary skill in the art.

The above-described fourth input to AND gate 58 is produced by circuit 62. Minimum "OFF" time circuit 62 ensures a minimum "OFF" or coil discharge interval during multicharge operation. Circuit 62 receives the output of OR gate 60 as an input, and generates an "OFF" time signal as an output, which is fed directly to AND gate 58. Assume that capacitor 64 is initially discharged during the assertion of electronic spark timing (EST) signal 34, due to a logic high voltage on both sides of capacitor 64. The voltage at the node common to capacitor 64 and resistor 66 is therefore substantially at a logic high voltage level. This logic high is provided to AND gate 58.

When the output of OR gate 60 goes low (i.e., command for switch 20 to turn "OFF"), however, the voltage level on the node common to capacitor 64 and resistor 66 goes to ground. Thereafter, the voltage increases with time in accordance with exponential relationships defined by the capacitance and resistance values of capacitor 64 and resistor 66, respectively. The logic low at the common node is fed to AND gate 58, maintaining the AND gate 58 output in a low logic state, keeping switch 20 "OFF". After a predetermined, minimum "OFF" time, the voltage at the common node will increase to such a level so as to operate as a logic high, which is provided to AND gate 58. At this point, the output of AND gate 58 will depend on its other input signals, particularly the input from secondary current trip circuit 52. Minimum "OFF" time circuit 62 ensures that switch 20 is maintained off for a set time before recharging of the coil 14 is commenced. For example, a short at spark plug 22, or a carbon fouled plug, may cause very quick discharge of coil 14. Circuit 62 prevents high frequency recharging/discharging, which is generally undesirable, by maintaining a minimum "OFF" time.

Control circuit 28 also includes primary current limiting circuit 42. Circuit 42 is configured to alter the ignition control signal $V_1$ when a primary current limit has been reached as determined by element 44. In the illustrated embodiment, primary current sense element 44 comprises a resistor having a predetermined resistance value. The voltage developed across resistor 44 varies as a function of the level of primary current flowing therethrough. The ignition control signal $V_1$ is altered so as to hold or maintain the primary current substantially at the primary current limit (e.g., 8A, 10A, etc.). In one embodiment, the altering step involves lowering the voltage of signal $V_1$ that is applied to switch 20. Primary current limiting circuit 42 may therefore comprise circuitry known to those of ordinary skill in the art configured to compare the sensed voltage with a reference voltage and, in response thereto, to reduce or lower the ignition control signal $V_1$ that is destined for the gate of switch 20.

It should be understood that when the output of OR gate 60 is in a logic high state, switch 20 is "closed", thus allowing a primary current to flow and increase. Additionally, when the output of OR gate 60 is in a logic low state, switch 20 is "open", thus, interrupting the primary current $I_p$. While the actual duration of the EST signal 34, and the subsequent charge and discharge intervals for multicharge operation will vary depending on a variety of factors, including the configuration of ignition coil 14, in one embodiment, the initial dwell duration (i.e., the initial duration for the EST signal 34) may be approximately one millisecond, while subsequent discharge intervals may be approximately 400 microseconds, and subsequent charge intervals may be approximately 500 microseconds. Elements 54, 56, 58, 60, 64 and 66 may comprise conventional components well known to those of ordinary skill in the art.

Figure 2:
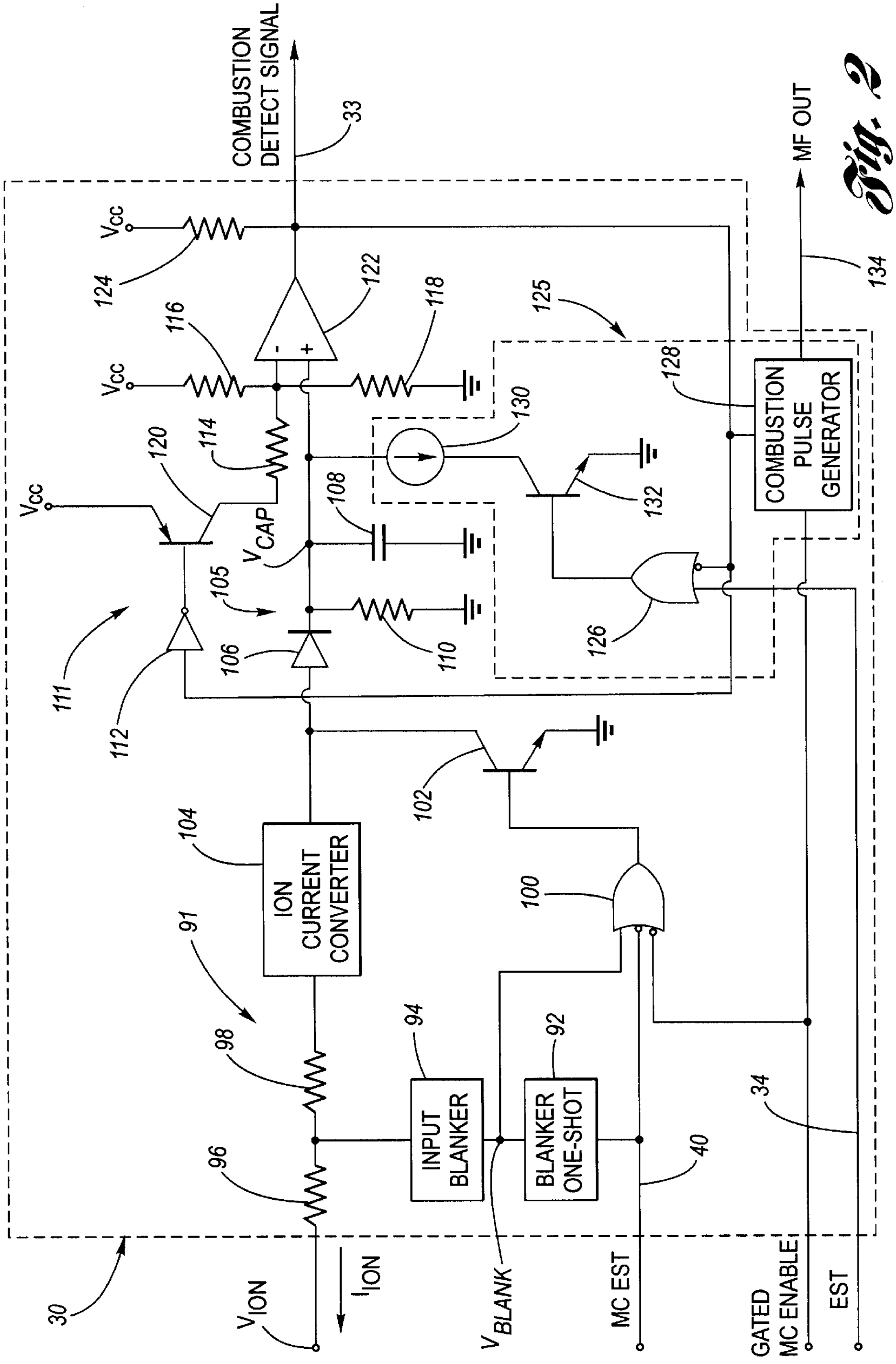
FIG. 2 is a simplified schematic and block diagram view showing, in greater detail, a combustion detection circuit illustrated in block form in FIG. 1.

FIG. 2 shows combustion detection circuit 30 in greater detail. Circuit 30 is configured to perform multiple functions. In particular, circuit 30 is configured to provide the means for sensing the ion current $I_{ION}$ flowing across node $V_{ION}$ through spark plug 22. Circuit 30 performs a conversion of the ion current $I_{ION}$ to a voltage signal (e.g., $V_{CAP}$), as well as the comparison of the $V_{CAP}$ signal with a reference voltage. When the reference voltage has been exceeded, circuit 30 outputs a combustion detect signal. Circuit 30 includes, in the illustrated embodiment, a blanking circuit 91 comprising a one-shot circuit element 92, an input blanker circuit 94, resistors 96, 98, a three-input logical OR gate 100, and a switch such as an NPN-type transistor 102. Blanking circuit 91 is configured generally to "blank", inhibit or otherwise suppress noise arising from the switching on of switch 20. This blanking or inhibiting action is conducted each time switch 20 is closed during multicharge operation (i.e., after the initial EST signal). Noise attendant the closure of switch 20, as coupled through ignition coil 14 is thus suppressed for a predetermined period so as to improve the accuracy and reliability of the ion current conversion process. One-shot element 92 generates a pulse, which in one embodiment is a positive-going pulse, having a duration equal to a blanking interval. This pulse is generated as a blanking signal designated $V_{BLANK}$. Input blanker 94 may comprise, for example, a transistor configured to ground the node common to resistive elements 96 and 98 to a ground node. Likewise, a blanking signal $V_{BLANK}$, when applied to OR gate 100, is operative to close switch 102 (i.e., place NPN transistor 102 in a conductive state), thereby grounding the output of ion current converter 104.

Circuit 30, in the illustrated embodiment, may further include an ion converter circuit 104. Ion converter circuit 104 is configured to source the $I_{ION}$ current through resistors 96 and 98, and to generate, in response thereto, a charging current that flows through diode 106 to charge capacitor 108. The charging current is of a level that corresponds to the level of the ion current $I_{ION}$. Ion current converter 104 may comprise a conventional current mirror of the like.

Circuit 30, in the illustrated embodiment, may further include an ion current storage circuit 105 comprising a diode 106, a capacitor 108 and an optional resistor 110. Ion current storage circuit 105 is provided to convert, in-effect, the charging current (which corresponds to the ion current $I_{ION}$) into a voltage, designated $V_{CAP}$. In the illustrated embodiment, the conversion process is substantially equivalent to an integration process, integrating the ion current. The resulting voltage, $V_{CAP}$, therefore corresponds to a degree of combustion that has occurred in the cylinder, inasmuch as the ion current level corresponds to the level of ionized molecules in the cylinder resulting from combustion. Other arrangements may include simply converting the level of the ion current to a corresponding voltage (without integrating).

Circuit 30, in the illustrated embodiment, may further include a comparison circuit 111 comprising an inverter gate 112, resistors 114, 116, 118, a switch such as a PNP-type transistor 120, a comparator 122, and a pull up resistor 124. Comparison circuit 111 is configured to compare the integrated ion current signal, namely the $V_{CAP}$ signal, against a threshold voltage, and generate in response thereto the combustion detect signal 33. In the illustrated embodiment, the combustion detect signal 33 may be a normally high, active-low, signal. Thus, when asserted, the combustion detect signal may be pulled low by comparator 122. Resistors 114, 116, and 118, along with inverter 112, and switch 120 provide a mechanism for selectively generating one of two threshold voltage references that are to be applied to the inverting input of comparator 122.

As to the first threshold, when the combustion detect signal 33 is inactive (i.e., a logic high), gate 112 outputs a logic low, which allows transistor 120 to turn on. The series relationship between (i) the parallel combination of resistors 114 and 116, and (ii) resistor 113, form a first voltage divider configuration having a first threshold voltage. When the integrated ion signal $V_{CAP}$ exceeds the first threshold voltage, the output combustion detect signal 33 is allowed to go to a logic low state.

As to the second threshold, once the combustion detect signal 33 goes low, the output of inverter gate 112 goes high, putting transistor 120 in a non-conductive state. This isolates resistor 114. The series relationship of (i) resistor 116, and (ii) resistor 118 form a second voltage divider configuration having a second threshold voltage that is lower than the first threshold voltage. The combustion detect signal 33 will stay low for a period of time until $V_{CAP}$ falls below the second, lower, threshold voltage. Circuit 125 is preferably employed to discharge capacitor 108 in a controlled fashion to extract useful information, as described below. Resistor 110 is added to offset the small bias current emanating from gate 106.

Circuit 30, in the illustrated embodiment, may further include an optional misfire detection stage 125 comprising a two-input logical OR gate 126, a combustion pulse generator 128, a constant current source 130, and a switch such as an NPN type transistor 132. Stage 12, generates a misfire output signal MF OUT 134. The misfire output signal MF OUT 134, when generated, is a pulse width modulated (PWM) signal having a duration indicative of the amount of combustion that occurred. The GATED MC ENABLE signal enables combustion pulse generator 128 to generate the variable pulse width MF OUT signal 134. The GATED MC ENABLE signal will transition high-to-low to enable generator 128 when either (i) the combustion detect signal is generated (i.e., combustion occurred), or (ii) the multicharge interval ends and the MC ENABLE goes low, even without combustion occurring.

When the combustion detect signal 33 is generated (i.e., goes low), or the output line 33 is brought low by generator 128 when GATED MC ENABLE goes low, current source 130 discharges capacitor 108 at a constant current discharge through transistor 132. The MF OUT signal is normally low. During this discharge, however, generator 128 outputs a high signal. The duration of the MF OUT signal 34 corresponds to the length of time required to discharge capacitor 108. When discharge of capacitor 108 drops $V_{CAP}$ below the second threshold voltage, the combustion detect signal 33 goes high. This signals generator 128 to end the MF OUT pulse.

Other configurations for circuit 30 are possible, which are within the spirit and scope of the present invention. For example, the ion sense signal may be a current signal proportional to the ion current, and therefore representative of such ion current in a predetermined manner.

Figure 3A:
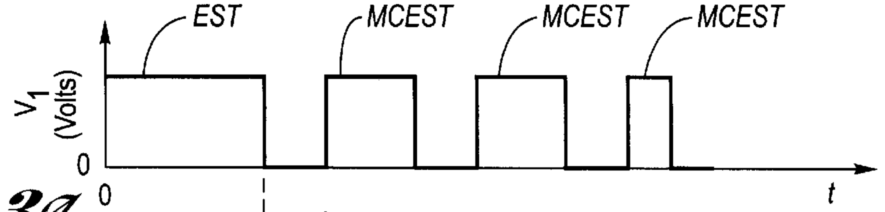
FIGS. 3A–3F are simplified, timing diagram views corresponding to the operation of the present invention.
Figure 3B:
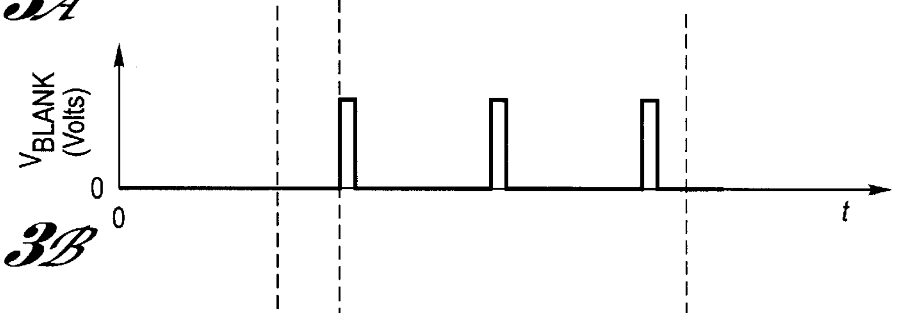
Figure 3C:
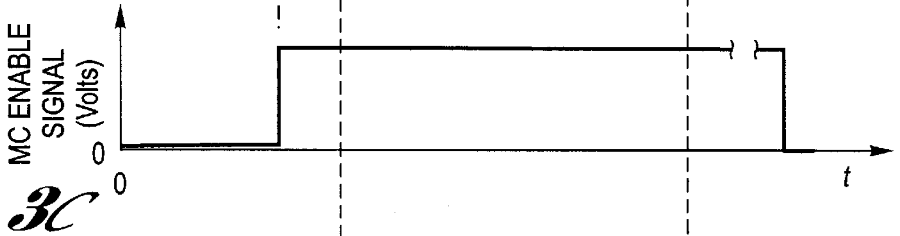
Figure 3D:
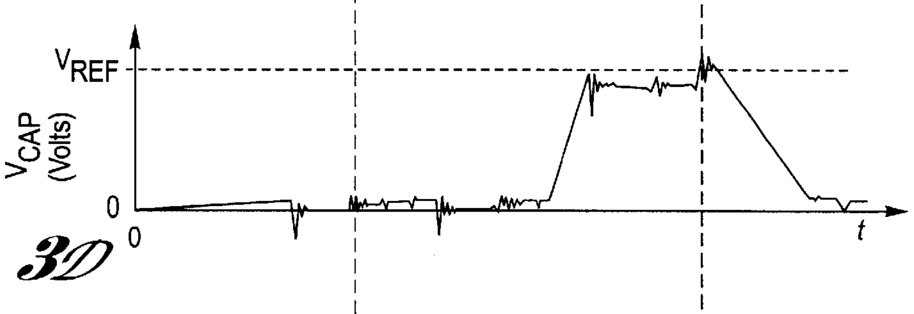
Figure 3E:
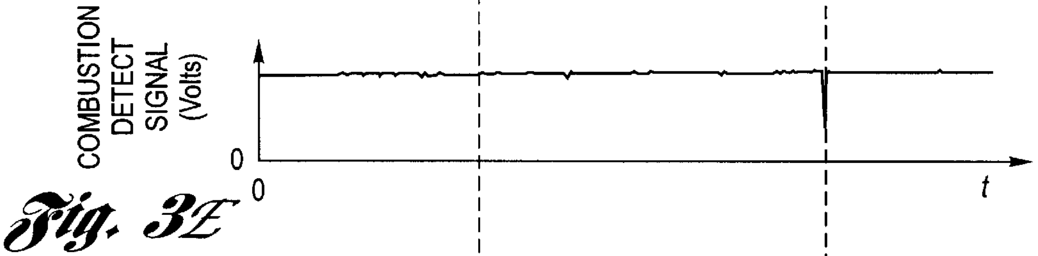
Figure 3F:
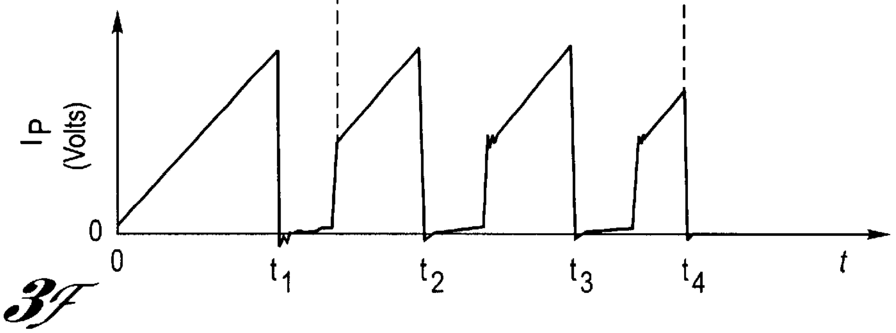

Referring now to FIGS. 3A–3F, the operation of an embodiment according to the present invention will now be set forth. PCM 32, in accordance with a predetermined operating strategy, determines when to assert the electronic spark timing signal EST 34. This signal is shown in FIG. 3A. The asserted EST signal 34 is the command to commence charging of ignition coil 14 for a first spark event. Circuit 38 of control circuit 28, in response thereto, adjusts the ignition control signal on node $V_1$, which causes switch 20 to conduct, wherein a primary current $I_p$ flows through primary winding 16. The primary current $I_p$ is shown in FIG. 3F. During the charging of ignition coil 14, a positive "make" voltage is generated across the spark gap. Inasmuch as this is the initial charging of ignition coil 14 in preparation of a first spark event, combustion has not yet occurred. Accordingly, notwithstanding the make voltage bias across spark plug electrodes 24, 26, no appreciable ion current flows. This is shown as a substantially zero $V_{CAP}$ voltage (i.e., the integrated ion current $I_{ION}$) in FIG. 3D. Also, this level of $V_{CAP}$ is insufficient to generate the combustion detect signal 33 (FIG. 3E, which shows an inverted combustion detect signal 33).

The EST signal 34 is applied, in the illustrated embodiment, as a positive going pulse having a duration corresponding to an initial ignition coil charge ("dwell") time. As described above, charging commences at the time of receipt by control circuit 28 of a rising (positive going) edge of the EST signal. Upon receipt of a falling (negative going) edge of the EST signal 34, circuit 38 of control circuit 28 causes switch 20 to open, thereby causing an interruption in the primary current $I_p$ at time t. It is well understood by those of ordinary skill in the art of ignition control that such interruption results in a relatively high voltage being immediately established across secondary winding 18, due to the collapsing magnetic fields associated with the interruption of the primary current. The secondary voltage will continue to rise until reaching a break down voltage across electrodes 24, 26 of spark plug 22. Current will thereafter discharge across the gap, as is generally understood in the art. During the spark event, a relatively large negative (relative to ground) voltage is established at the spark plug. A spark current flows from ground across spark plug electrodes 24, 26, through secondary winding 18, and thereafter through forward-biased diode 46, through resistor 48 and back to ground.

As also illustrated, PCM 32 asserts the MC ENABLE signal 36 when the EST signal is deasserted, indicating that multicharge operation is desired. This will enable circuit 38. The secondary current will then decay. When the secondary current has decayed down to a preselected level, control circuit 28 generates or otherwise asserts a first one of a plurality of MC EST pulses 40. The MC EST signal 40 defines a command to cause switch 20 to reconnect primary winding 16 to ground, ostensibly to recharge ignition coil 14 by causing the primary current $I_p$ to flow through primary winding 16. During the recharge interval, which lasts only so long as the primary current level is less than the primary current trip level, the make voltage is again established across secondary winding 18.

As shown in FIG. 3B, switching noise is suppressed or inhibited by blanking, in accordance with a blanking pulse $V_{BLANK}$.

For the duration of each MC EST pulse signal, the switch 20 is closed to cause the primary current to flow. This closure causes a "make" voltage to be impressed across secondary winding 18, which, in the configuration shown in FIG. 1, biases spark plug 22 with a relatively positive voltage. If combustion has occurred, the make voltage bias will cause an ion current $I_{ION}$ to flow. The ion current will be sourced only through combustion detect circuit 30, inasmuch as diode 46 is back-biased. The magnitude of the ion current is dependent upon the concentration of ions, which in turn corresponds to the quality of combustion.

Primary current $I_p$ is again interrupted at time t2 and t3 to produce respective second and third sparks. As shown in FIG. 3D, a relatively large, increasing $V_{CAP}$ signal is generated between the second and third sparks, which indicates combustion. FIG. 3D also illustrates a reference voltage $V_{REF}$. When $V_{CAP}$ reaches $V_{REF}$, the combustion detect signal 33 is generated. The change of state of the combustion detect signal 33 is the signal to control circuit 28 to terminate multicharge operation, which occurs at time t4. Thus, the primary current is again interrupted. $V_{REF}$ indicates a desired level of combustion.

A system in accordance with the present invention provides accurate and reliable implementation of a repetitive spark system without unnecessary spark plug wear. The inventive system accomplishes the foregoing by terminating the multicharge operation when a companion combustion detection circuit determines that a predetermined level of combustion has occurred.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

What is claimed is:

1. An ignition system for an internal combustion engine including an ignition coil having a primary winding and a secondary winding coupled to a spark plug in a combustion cylinder of said engine, a switch responsive to an ignition control signal for causing a primary current to flow through said primary winding, a control circuit configured to generate said ignition control signal so as to produce a plurality of sparks at said spark plug during a combustion event in said cylinder, characterized by:

a combustion detection circuit in sensing relation with said combustion cylinder configured to generate a combustion detect signal when combustion occurs to a predetermined level; and wherein said control circuit is further configured to terminate said generation of said ignition control signal during said combustion event responsive to said combustion detect signal.

2. The ignition system of claim 1 wherein said control circuit is responsive to a first electronic spark timing signal having a duration corresponding to a respective charge interval of said ignition coil associated with a first one of said plurality of sparks.

3. The ignition system of claim 2 wherein said control circuit is further responsive to an enable signal having a duration corresponding to a multicharge interval in which said plurality of sparks may be generated for said combustion event of said cylinder.

4. The ignition system of claim 3 wherein said control circuit includes means for generating a second EST signal having active and inactive states corresponding to respective charge and discharge intervals of said ignition coil associated with said plurality of sparks after said first one of said sparks.

5. The ignition system of claim 4 wherein said control circuit includes means for outputting said ignition control signal as a function of said first and second EST signals.

6. The ignition system of claim 5 wherein said outputting means comprises an OR logic gate.

7. The ignition system of claim 6 wherein said outputting means further comprises a timing circuit including a resistive element and a capacitive element, said timing circuit being configured to establish said respective durations of said active and inactive states of said second EST signal.

8. The ignition system of claim 4 wherein said second EST signal generating means is further responsive to said combustion detect signal.

9. The ignition system of claim 8 wherein said second EST signal generating means comprises an RS flip flop, a first AND logic gate and a second AND logic gate.

10. The ignition system of claim 9 wherein said first EST signal is applied to a reset input of said RS flip flop to place an inverted output thereof in an active state.

11. The ignition system of claim 10 wherein said combustion detect signal is applied to a set input of said RS flip flop such that said inverted output thereof will be forced to an inactive state in response thereto.

12. The ignition system of claim 11 wherein said first AND logic gate includes a first input coupled to said inverted output of said RS flip flop, and a second input coupled to receive said enable signal.

13. The ignition system of claim 12 wherein an output of said first AND logic gate is coupled to an input of said second AND logic gate, said second AND logic gate having an output configured to generate said second EST signal.

14. The ignition system of claim 1 wherein said combustion detection circuit comprises an ion current sensing system configured to generate said combustion detect signal.

15. The ignition system of claim 14 wherein said ion current sensing system includes a circuit for producing said combustion detect signal when an ion current through said spark plug exceeds a preselected level.

16. The ignition system of claim 14 wherein said ion current sensing system includes a circuit for producing said combustion detect signal when an integrated ion current through said spark plug exceeds a preselected level.

17. An ignition system for an internal combustion engine, comprising:

an ignition coil having a primary winding and a secondary winding coupled to a spark plug in a combustion cylinder of said engine;

a switch responsive to an ignition control signal for causing a primary current to flow through said primary winding;

a control circuit configured to generate said ignition control signal so as to produce a plurality of sparks at said spark plug during a combustion event in said cylinder;

a combustion detection circuit in sensing relation with said combustion cylinder configured to generate a combustion detect signal when combustion occurs;

said control circuit being further configured to terminate said generation of said ignition control signal during said combustion event responsive to said combustion detect signal, said control circuit being further operated to terminate said generation of said ignition control signal when a combustion interval ends.

18. In an ignition system for an internal combustion engine including an ignition coil having a secondary winding configured to be connected to a spark plug disposed proximate a cylinder of the engine, a method of controlling ignition comprising the steps of:

(A) determining a multicharge interval during which a plurality of sparks are generated using the spark plug;

(B) generating at least a first one of the plurality of sparks proximate the cylinder during the multicharge interval;

(C) generating a combustion detect signal when combustion occurs in the cylinder; and (D) terminating the multicharge interval in response to the combustion detect signal.

19. The ignition system of claim 18 wherein step (A) comprises the substeps of:

determining a duration of the multicharge interval;

determining a number of sparks to occurs during the multicharge interval.

20. The ignition system of claim 18 wherein step (C) comprises the substep of:

biasing the spark plug a predetermined time after each spark;

measuring an ion current produced in response to the biasing step;

comparing the measured ion current with a predetermined ion current level; and producing the combustion detect signal when the measured ion current exceeds the predetermined ion current level.

* * * * *